Patented May 21, 1940

2,201,883

UNITED STATES PATENT OFFICE 2,201,883

TREATMENT OF SULPHUR-CONTAINING DISTILLATES

Robert E. Burk, Cleveland, Ohio, assignor to The Standard Oil Company, Cleveland, Ohio, a corporation of Ohio No Drawing. Application December 23, 1937, Serial No. 181,324

2 Claims. (Cl. 196—33)

In treating light petroleum distillates containing sulphur compounds, particularly in so-called "sweetening" it is an established custom to subject the distillate to a doctor solution or sodium plumbite solution, and then add elemental sulphur. Such usage of sulphur has the inherent objection of carrying into the distillate a material which itself is highly detrimental and capable of occasioning considerable trouble from corrosion etc. But precautions against such difficulty have remained merely in the general realm of efforts at exercise of care in the amounts of elemental sulphur so added. In accordance with the present invention however, it now becomes possible to obviate employment of elemental sulphur, and with excellent results and convenience of practice.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

A petroleum distillate containing sulphur and requiring sweetening, is, in accordance with the invention, subjected to the action of a peculiar doctor solution or sodium plumbite solution made up with caustic soda concentrated as heretofore prohibited. Thus, whereas the customary doctor solution is made up of 10 per cent NaOH, I make up a sodium plumbite solution employing as high as 40 per cent NaOH, and preferably about 24 percent NaOH. The excessively strong caustic soda solution is moreover fully saturated with PbO, or an excess of the latter may be used. Gasoline, kerosene, furnace oil distillates, etc., are thus treatable. While not definitely committing myself to any particular theory, there is reason to believe that in reaction, basic lead mercaptides are formed in the presence of such large excess of sodium plumbite, and these basic compounds determine the different behavior, in contrast to ordinary mercaptides. The distillate treated with the solution as noted, is next subjected to the action of an adsorbent agent, as clay, natural or activated, etc., the distillate being brought into efficient contact with the adsorbent, by contact-mixing or by percolating the distillate through a bed of the adsorbent agent. Peculiarly, the adsorbent agent holds the basic lead mercaptides or compounds formed in the treatment, and the distillate after separation from the adsorbent agent shows doctor sweet or nearly doctor sweet without having had any application of sulphur whatsoever.

As an example: A raw cracking-coil naphtha containing 0.0398 per cent total sulphur was treated with a solution made up as foregoing, with 30° Bé. caustic soda. The distillate was then filtered through clay "Filtrol", and the product showed a total sulphur content of 0.0277 per cent. The mercaptan sulphur was 0.0008 per cent. Such distillate correspondingly treated with conventional doctor solution made up with 15° Bé. caustic soda showed very little effect. The lead mercaptides formed (apparently normal mercaptides) did not adsorb correspondingly into the clay.

Other modes of applying the principle of the invention may be employed, change being made as regards the details described, provided the features stated in any of the following claims, or the equivalent of such, be employed.

I therefore particularly point out and distinctly claim as my invention:

1. In a process of sweetening mercaptan-containing petroleum distillates, subjecting the distillate to conditions favoring formation of basic mercaptides by the action of a solution formed by saturating 20–40 per cent NaOH solution with litharge, and then adsorbing the resulting sulphur-containing compounds by subjecting the same as dissolved in the distillate to the action of an adsorbent agent.

2. In a process of sweetening mercaptan-containing petroleum distillates, subjecting the distillate to conditions favoring formation of basic mercaptides by the action of a solution formed by saturating about 24 per cent NaOH solution with litharge, and then adsorbing the resulting sulphur-containing compounds by subjecting the same as dissolved in the distillate to the action of clay.

ROBERT E. BURK.